Patented May 8, 1934

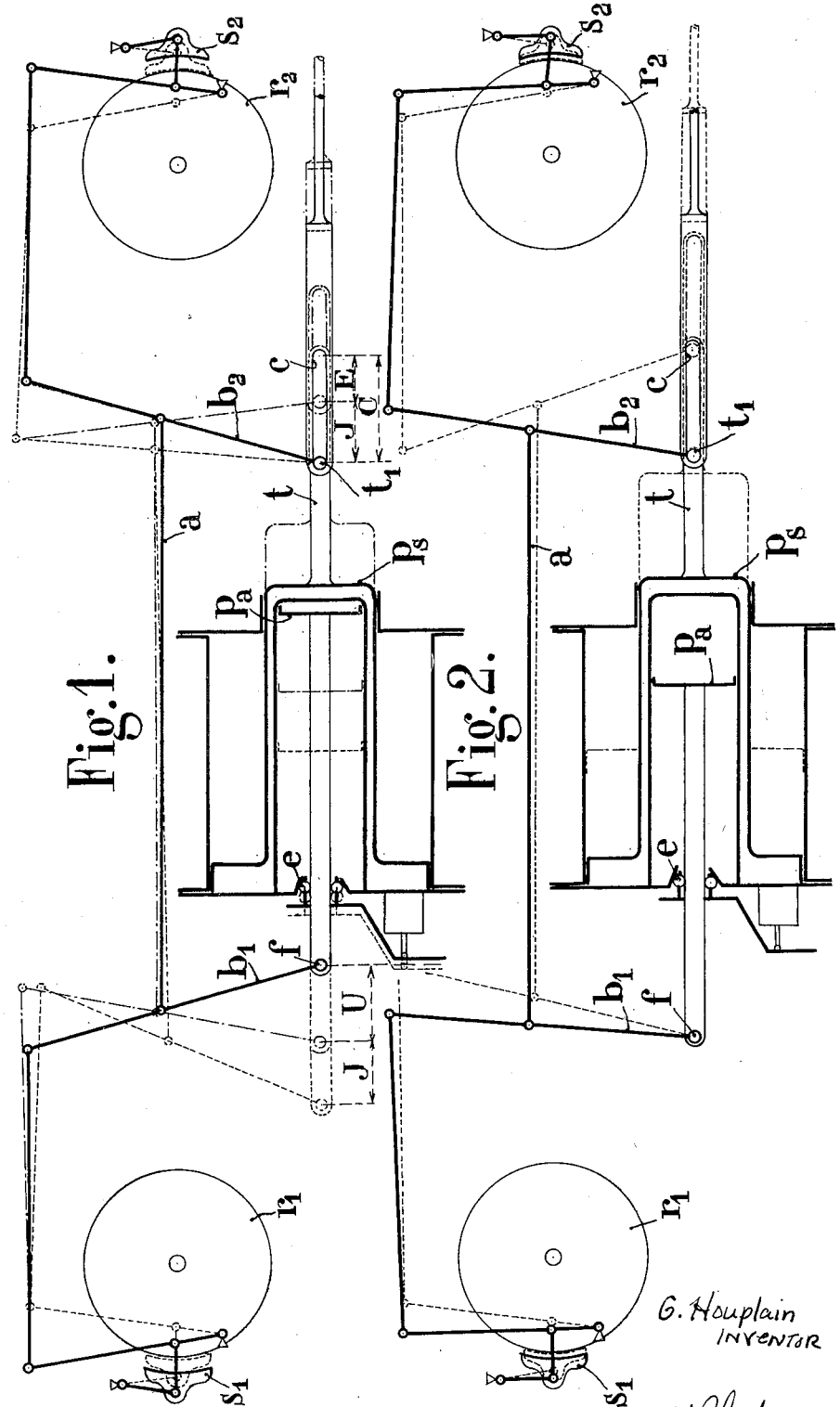

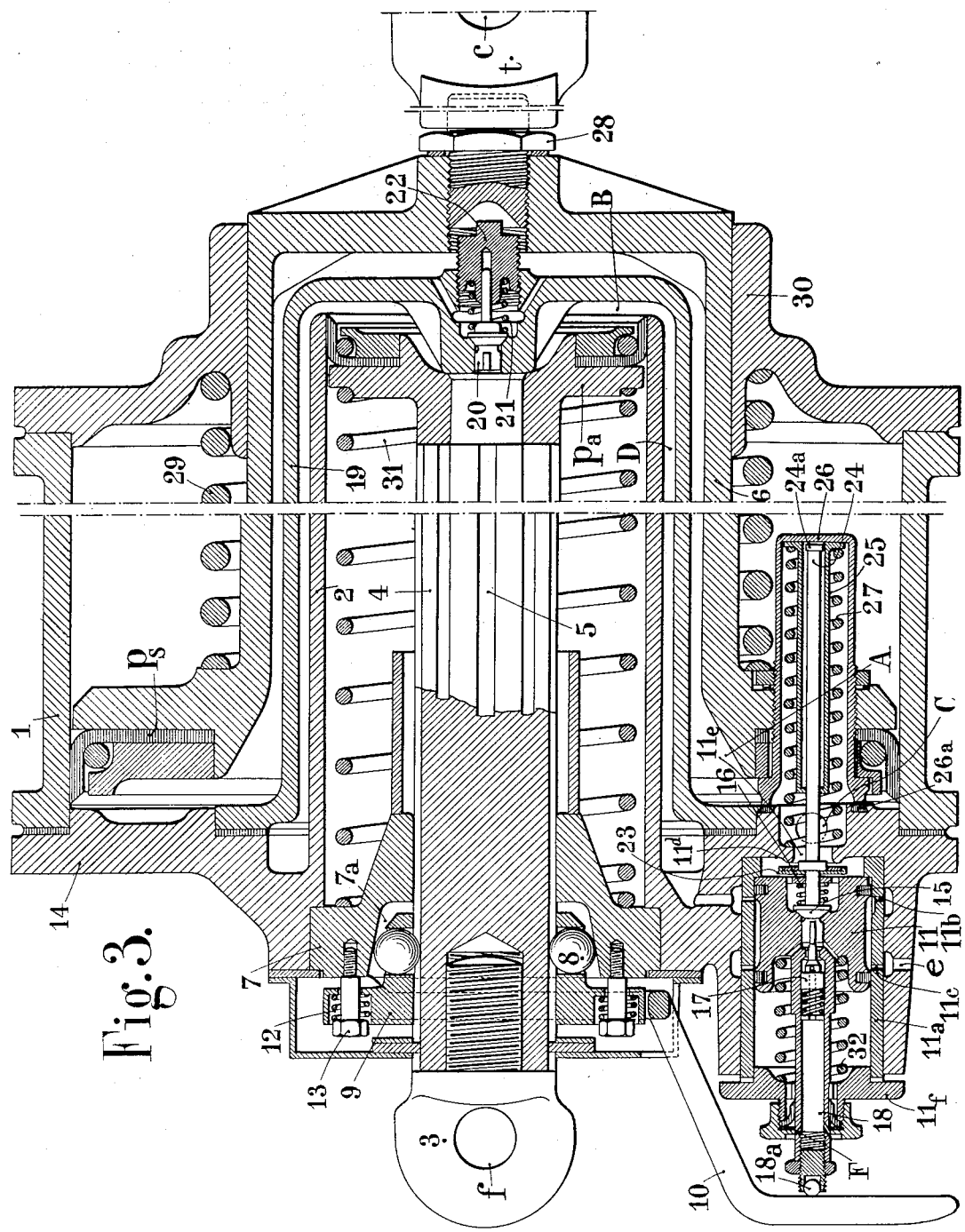

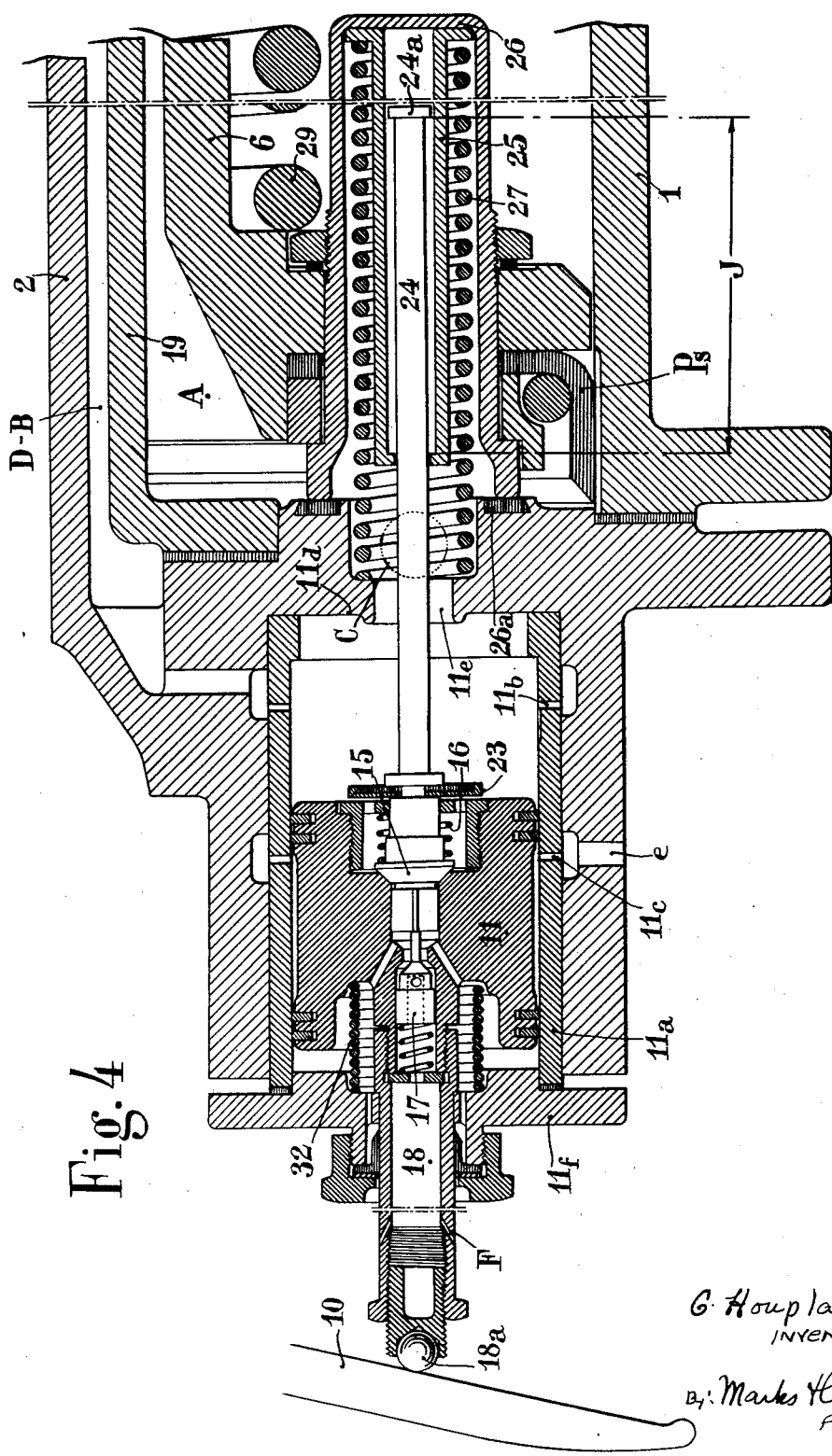

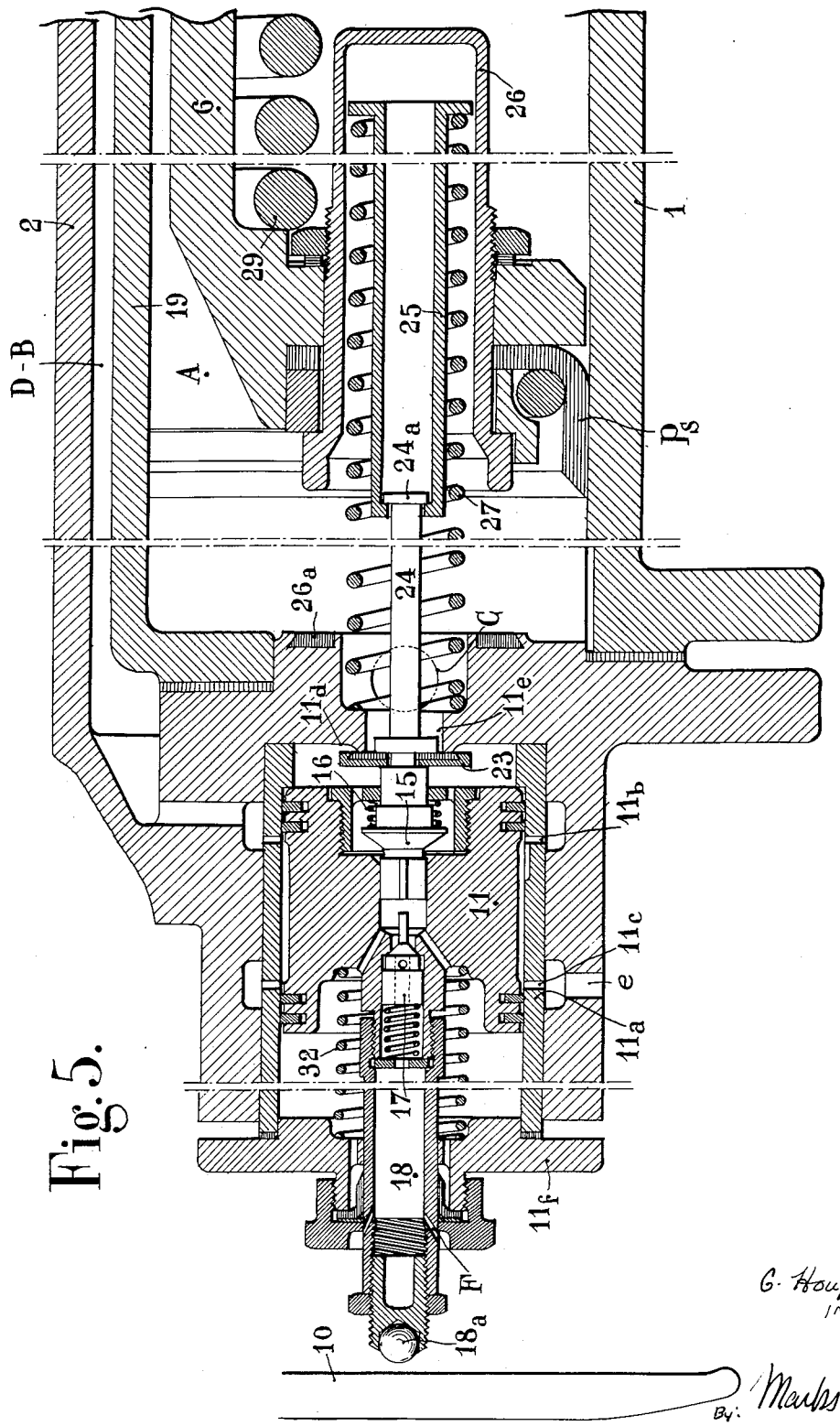

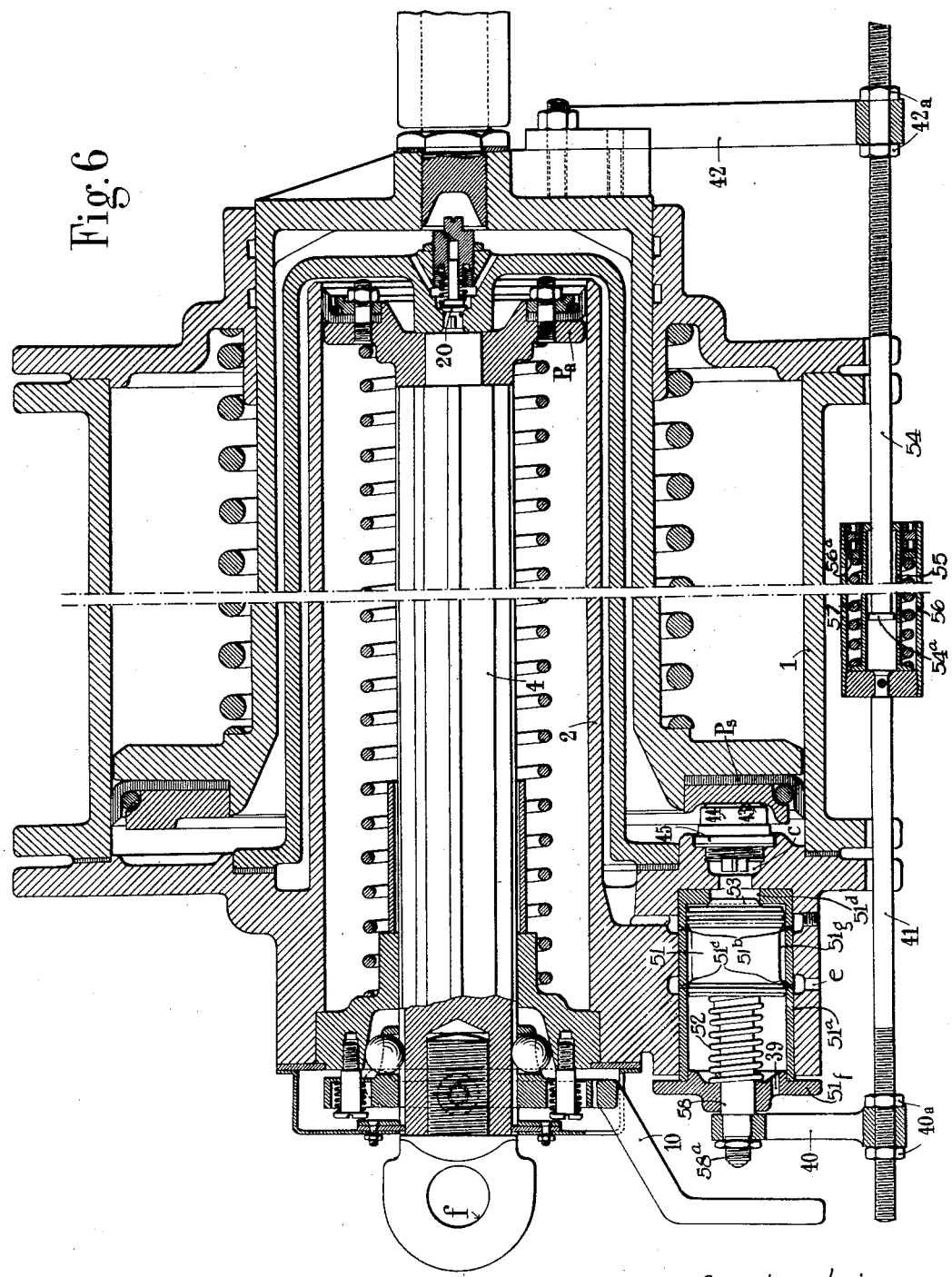

1,957,890

UNITED STATES PATENT OFFICE 1,957,890

SLACK ADJUSTING DEVICE FOR BRAKES

Georges Houplain, Paris, France, assignor to Societe Des Freins Houplain, Paris, France Application March 31, 1932, Serial No. 602,289
In France April 9, 1931

3 Claims. (Cl. 188—198)

This invention has for its object a device, more particularly applicable to railway vehicles, and arranged for automatically taking up, upon each application of the brakes, the play due to the wear of the brake shoe linings, of the joints, etc., and maintaining at a constant value the operative displacement of the brake shoes, that is to say the displacement to which they must be subjected in order to come, from their released position, in contact with the rims of the wheels.

The device according to the invention will be hereinafter described, with reference to the accompanying drawings in which:

Figs. 1 and 2 diagrammatically show the compressed air control and the brake rigging.

Figs. 3 to 8 show various embodiments of this device, by way of example only.

Fig. 3 is a longitudinal section of a first embodiment, in brake releasing position.

Figs. 4, 5 are two partial longitudinal sections of same, on an enlarged scale, respectively corresponding to two different phases of the brake-applying movement.

Figs. 6, 7 illustrate a modification of the above form of construction.

Fig. 6 is a view similar to Fig. 3.

Fig. 7 is a partial vertical section, made on an enlarged scale.

Fig. 8 is a vertical section of another form of construction.

Figure 7:
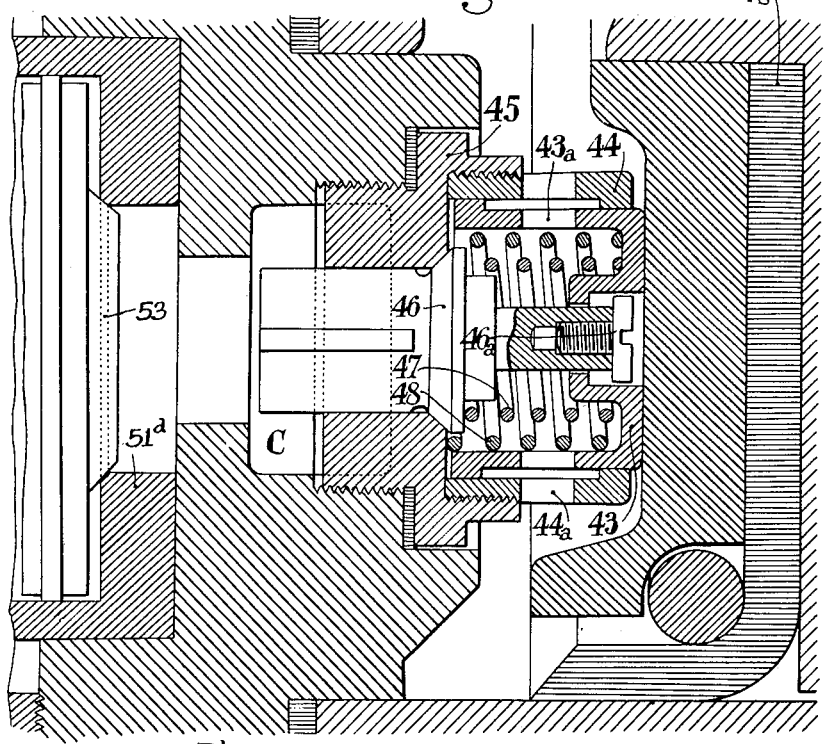

In Figs. 1 and 2, the circles with a triangle represent the fixed points of the brake rigging; the joints connecting the various members of this brake rigging are represented by simple circles.

The brake rigging, adapted to apply the brake shoes $s_1$, $s_2$ upon the wheels $r_1$, $r_2$, comprises the usual parts, and particularly two levers $b_1$, $b_2$ connected by a tie rod $a$. This brake rigging is actuated by a compressed air driving device comprising two pistons viz: an auxiliary piston $p_a$, adapted to take up the play, and a brake-applying piston $p_s$, adapted to apply the brake shoes on the wheels.

The lever $b_1$ is pivoted at $f$ on the rod of the piston $p_a$, which point $f$ corresponds to the so called "fixed point" of ordinary brake riggings; the lever $b_2$ is actuated by the rod $t$ of the piston $p_s$, through the medium of a pin $t_1$ and of a slotted link $c$ arranged in the usual manner for allowing the operation of a hand braking device (not shown).

A locking device $e$, mounted on the rod of piston $p_a$, can be put in or out of action, at will, and, in the former case, it locks the said rod, which is constantly urged towards the right-hand side of the drawing by a returning device (not shown), thus rendering the point $f$ fixed for the normal operation of the device as in ordinary brake riggings.

It will be assumed that the position of the device is first that shown in full lines in Fig. 1 when the brakes are released. The braking operation of the brake valve handle first causes the air to be admitted under piston $p_a$ through the medium of a suitably arranged distribution device. Piston $p_a$ then moves the brake shoes into contact with the rims of the wheels through the medium of the rigging the pin $t_1$ of which serves as a fixed point.

At this moment, the entire structure is in the position illustrated in dotted lines in Fig. 1, and the piston $p_a$ has effected a stroke $U+J$ comprising a portion U which corresponds to the stroke necessary for taking up the supplementary play due to wear, and a portion J which corresponds to the normal clearance left between the brake shoes and the rims of the wheels.

Subsequently, the locking device $e$ being out of action, the piston $p_s$ is actuated in its turn, and moves the brake rigging, the pivotal points of which on the brake shoes $s_1$, $s_2$ are then fixed points, these brake shoes being applied on the rims of the wheel.

During this movement, piston $p_s$ drives piston $p_a$ with it towards the right-hand side of the drawing through the medium of the brake rigging connection $b_2$—$a$—$b_1$.

The locking device $e$ is put in action when the piston $p_s$ has thus effected the stroke J above defined, and has moved the piston $p_a$ back with it according to the same distance J; this arrangement is shown in dot and dash lines in Fig. 1.

If, from this moment, the piston $p_s$ continues to be actuated, the point $f$, which is held stationary by the locking device $e$, is then a fixed point of the brake rigging, and the brake shoes are applied on the rims of the wheels.

The complete application of the brake shoes is therefore effected when the piston $p_s$ has moved according to a distance $C=J+E$, E corresponding to the supplementary displacement to which this piston must be subjected from the moment the brake shoes are applied on the wheels for effecting the required application of the brakes. This arrangement is shown in dotted lines in Fig. 2.

For releasing the brake shoes, it suffices to restore piston $p_s$ to its initial position; the brake rigging operates in the usual manner, with $f$ as a fixed point, the rod of the piston $p_a$ being held stationary by the combined action of the locking device $e$ and of the returning device above mentioned.

This brake-releasing position is shown in full lines in Fig. 2.

The brake-releasing position shown in full lines in Fig. 2 differs from that shown in full lines in Fig. 1 in that piston $p_a$ and fixed point $f$ have been moved to an extent U such that the supplementary play has been taken up.

In the device shown in Fig. 3, the brake-applying piston $p_s$ moves in a fixed cylinder 1; it is rigid with a cylindrical body 6 sliding in a guide 30, and carries the rod $t$ actuating the brake rigging, and secured thereto by a bolt 28.

This piston is constantly urged towards the position of rest shown in Fig. 3 by a compression spring 29.

The bottom 14 of the cylinder 1 carries a cylindrical casing 19 arranged in the body 6, and, within this casing, a second cylinder 2 in which the auxiliary piston $p_a$ moves.

The space A comprised between the piston $p_s$ and the bottom 14 communicates with the space D—B comprised between the cylinder 2 and the casing 19, and between the bottom of this casing and the piston $p_a$, through an orifice provided in the said bottom, and normally closed by a valve 20 opening towards the space A. This valve is maintained on its seat by a spring 21, compressed between the said valve and a nut 22.

The piston $p_a$ is urged toward its position of rest by a compression spring 31.

The rod 4 of this piston passes through a bowl 7 carried by the bottom 14, and terminating at its end in a small crosshead 3, in which is provided an orifice $f$ adapted to receive the pivot constituting the adjustable fixed point of the brake rigging.

A frustrum-shaped housing 7a is provided in the outer face of the bowl 7, and, between the wall of this housing and the rod 4 are arranged balls 8 mounted in the recesses of a cage 9 in which the shaft 4 freely slides.

The balls 8 are pressed against the rod 4 and the wall of the housing 7a by springs 12, compressed between the cage 9 and the heads of bolts 13 screwed in the bowl 7.

The balls 8 slide in longitudinal grooves 5 of the rod 4.

The entire structure constitutes a locking device which allows the rod 4 to freely move out from the cylinder 2, but locks it when it tends to move backwards.

This locking device can be put out of action by a lever 10, controlled by a device described later on, and by means of which the said cage can be moved towards the left-hand side of Fig. 3.

The bottom 14 carries a valve gear for controlling the lever 10 and arranged as follows:

In a bore of this bottom is arranged a cylindrical slide face 11a provided with two series of ports 11b, 11c; the ports 11b communicate with the annular space D, and the ports 11c communicate with the atmosphere through an orifice $e$ of the bottom 14.

The slide valve 11, which moves in this slide face 11a, is provided with an axial passage-way normally closed by a valve 15, held in closed position by a returning spring 16.

A rod 24, rigid with the valve 15, passes through the bottom 11d of the housing of the slide valve 11, through an orifice 11e and carries a valve 23 which can close this orifice, but is normally held spaced therefrom.

This rod passes through the bottom of a socket 25, and is provided with a shoulder 24a, which can abut against this bottom.

The socket 25 is arranged in a second socket 26, rigid with the piston $p_s$, and a compression spring 27, pressing against the wall 11d, holds the edge of the socket 25 against the bottom of the socket 26.

A conduit, extending from the triple valve, opens at C behind the wall 11d; it is normally separated from the space A by the edge of the socket 26, which presses upon a fluid-tight packing 26a of the bottom 14.

The slide valve 11 is moreover provided with a tube 18, which passes through the front wall 11f of the slide face 11a, and communicates with the atmosphere through orifices F.

This tube carries, at its end, a ball 18a which presses upon the locking lever 10.

The tube 18 causes the space existing in front of the slide valve 11 to communicate with the atmosphere. This communication can be cut off by the valve 17 mounted in the tube 18, and controlled by the valve 15, in such a manner that it is open when the latter is closed, and reversely.

A compression spring 32 normally holds the slide valve in the position illustrated.

The operation is as follows:

The apparatus being in the position of rest and the brake rigging being in brake-releasing position, as shown in full lines in Fig. 1, a reduction in pressure created in the main brake pipe causes the orifice C to communicate with the auxiliary tank, and compressed air is admitted into said orifice.

This air passes through the orifice 11c, and pushes the slide valve 11 towards the left-hand side of the drawing, at the same time compressing the spring 32.

Behind this slide valve, air is discharged by the valve 17 which is open, and through the tube 18 and orifices F; a back pressure which would hinder the movement of the slide valve is thus avoided.

The slide valve 11 thus comes to the position shown in Fig. 4; at this moment, the ball 18a has moved the lever 10 and has put the device locking the rod 4 out of action; the shoulder 24a of the rod 24 has moved to the left until it is a distance from the bottom of the socket 25 equal to the distance J above defined and dimensioned in Fig. 4, and the orifices 11b have been uncovered, thus putting the orifice C into communication with the space D, B.

The air thus admitted behind the piston $p_a$ causes the latter to move towards the left-hand side of the drawing, until the brake rigging occupies the position shown in dotted lines in Fig. 1 and that the brake shoes are applied against the wheels.

At this moment, the piston $p_a$ is held stationary, and the air pressure in the space B increases and lifts the valve 20, thus entering the space A.

The piston $p_s$ then begins to move towards the right-hand side of the figure.

As socket 26 is rigid with piston $p_s$, its edge moves away from packing 26a as soon as said piston $p_s$ starts, so that air is then directly admitted from orifice C into space A.

Compression spring 27 presses the edge of socket 25 upon the bottom of socket 26, so that both sockets 25 and 26 move together with piston $p_s$ and socket 25 freely slides on rod 24 as long as its bottom has not come into contact with the head 24a of said rod.

Slide valve 11 remains then in the position shown in Fig. 4 and keeps the locking device for rod 4 out of action.

It results therefrom that piston $p_a$ is driven towards the right-hand side of the drawing by piston $p_s$ through the medium of brake rigging members $b_2$—$a$—$b_1$ (Figs. 1 and 2) as has been hereinbefore explained.

This movement proceeds until piston $p_s$ is at a distance J from its rest position, since the clearance between the head 24a of rod 24 and the bottom of socket 25 is J when the device is in the position illustrated in Fig. 4.

When said clearance is taken up, that is to say, when the device comes to the position shown in dash and dotted lines in Fig. 1, the bottom of socket 25 abuts against head 24a. Since piston $p_s$ and socket 26 move on towards the right, spring 27 still moves socket 25, which in its turn pulls rod 24 towards the right, thus opening valve 15 and shutting valve 17.

The opening of valve 15 sets both ends of cylinder 11a into communication, and valve 11 is pushed back to its initial position by spring 32, while the shutting of valve 17 keeps the compressed air contained in cylinder 11a from evolving out through orifices F.

The movement of rod 24 and socket 25 and the extension of spring 27 are stopped when valve 23, rigid with rod 24, abuts against its seat 11d. Since piston $p_s$ and rod 26 move on towards the right, the bottom of socket 26 moves away from the edge of socket 25.

The valve gear is then in the position illustrated in Fig. 5, in which lever 10 is released, so that rod 4 is locked, and the valve gear is again separated from the orifice C. The cylinder 2 is connected to exhaust through spaces B, D, orifices 11b, 11c, which the slide valve causes to communicate together, and orifices e.

The spring 31 tends to return the piston $p_a$ towards the right, but the device locking the rod 4 has been returned to its locking position and holds this piston stationary.

The piston $p_s$ continues to move through the distance E, and the brake rigging, having f as fixed point comes to the position shown in dotted lines in Fig. 2 and applies the brakes.

Upon release of the brakes, the orifice C is put in communication with the atmosphere through the triple valve.

The piston $p_s$ urged by the spring 29, comes back to its initial position and restores the brake rigging to the position shown in full lines in Fig. 2.

At the end of the displacement, the edges of the socket 26 come against the packing 26a and close the orifice C.

The bottom of the socket 26 abuts against the shoulder 24a of the rod 24, and causes, on the one hand, the closing of the valve 15, on the other hand, the opening of the valve 23 and of the valve 17.

Both faces of the slide valve are therefore in communication with the atmosphere, through the orifice C and through the tube 18, respectively.

The entire structure has come back to its initial position, with the only difference that piston $p_a$, and, with it, the fixed point f, have moved towards the left according to an extent corresponding to the play to be taken up.

Figs. 6, 7 illustrate a modification which has particularly the advantage of appreciably facilitating the adjustment of the play or clearance to be maintained, this adjustment being effected by acting on a nut arranged outside the cylinder.

According to this modification, the slide valve 11 is replaced by a full one, 51, sliding in a cylinder 51a provided with ports 51b, 51c which respectively correspond to the above mentioned ports 11b, 11c. Said valve 51 is provided, on its right-hand face in the drawing, with a conical bearing portion 53 acting as a valve. In the position of rest illustrated, and under the action of the returning spring 52 of the slide valve, this bearing portion fits against a seat provided in the bottom 51d of the housing of the slide valve, thus separating this housing from the orifice C.

The left-hand face of the slide valve 51 communicates with the atmosphere through an orifice 39 provided in the cover 51f of the slide valve housing.

The sliding system connecting the piston $p_s$ to the slide valve is here arranged outside the cylinder, so that easy access may be had thereto, and that it can be adjusted without having to remove any member.

This system comprises, on the one hand, a cylindrical sheath 56 which is rendered rigid with the slide valve 51 by a lug 40 and a rod 41, on the other hand, a rod 54 which is arranged according to the axis of the sheath 56, and secured to the piston $p_s$ by a lug 42.

The connection between the sheath 56 and the rod 54 is ensured by the socket 55 which slides in the bottom 56a of the sheath 56, and the spring 57, which is compressed between a ledge of this socket and the bottom 56a; the rod 54 is provided, at its end, with a shoulder 54a which can abut against the bottom of the socket 55 for moving the sheath through the medium of the spring 57.

The rods 41 and 54 are respectively secured on the lugs 40, 42 by nuts and lock-nuts 40a and 42a allowing to adjust the time when, during application of the brakes, the shoulder 54a abuts against the bottom of the socket 55.

The communication between the orifice C and the cylinder 1 of the piston $p_s$ is ensured by a valve 46 resting on a seat 45, screwed on the bottom of the cylinder, and opening inwardly thereof (Fig. 7).

The seat 45 is rigid with the socket 44 in which slides a cap 43 covering the head of the valve 46, and two returning springs 47, 48 are compressed between the bottom of this cap, and the head of the valve and the seat 45, respectively.

The valve carries a screw 46a, the head of which passes through the bottom of the cap 43 and can abut against this bottom for limiting the extension of the spring 47.

In the position of rest illustrated, the piston $p_s$ presses on the bottom of the cap 43 and pushes it into the socket 44, thus compressing the springs 47, 48 and holding the valve 46 in closed position.

The operation is as follows:

When, owing to a reduction in pressure in the main brake pipe, the orifice C is put in communication with the auxiliary tank, the pressure of the air pushes the slide valve 51 towards the left, thereby compressing its spring 52.

The orifices 51b of the slide face 51a are then uncovered, and the piston $p_a$ is actuated by the mechanism above described, at the same time as the device locking the rod 4 is put out of action to release said rod.

When the piston $p_a$ has moved the brake shoes in contact with the rims of the wheels, the opening of the valve 20 admits air behind the piston $p_s$ and causes this piston to move towards the right-hand side of the drawing.

Immediately upon beginning of the movement of $p_s$, the cap 43 is released, and its spring 48 causes it to slide in the socket 44; when the head of the screw 46a abuts against the bottom of the cap, the latter and the valve 45 move together, and, owing to the opening of this valve, air is directly admitted behind the piston $p_s$, through orifices 43a, 44a, and the valve 20 falls back upon its seat.

The piston $p_s$, through the medium of the brake rigging, drives the piston $p_a$, the rod 4 of which is unlocked, and moves it back towards the right, until the shoulder 54a of the rod 54 abuts against the bottom of the socket 55, and drives the sheath 56 through the medium of the spring 57.

The slide valve 51, actuated by the rod 41 and the lug 40, comes back to its initial position, this having for effect, on the one hand, to release the lever 10 and to cause the locking of piston $p_a$, on the other hand, to cause the cylinder 2 to be connected to exhaust through orifices 51b, 51c and e, and the slot 51g provided in the slide valve.

Owing to the nuts 40a, 42a, which allow, as previously stated, to vary the relative position of the two sliding parts 54, 25, it is possible to easily modify the time when the above operations take place, and consequently, to adjust the play or clearance to be maintained between the brake shoes and the rims.

From the moment the piston $p_a$ is locked, the application proper of the brakes takes place with $f$ as fixed point; the displacement of the rod 54 and of the sheath 55 has for effect to compress the spring 57.

Upon release of the brakes, the cylinder 1 of piston $p_s$, is directly connected to exhaust through the valve 46, which remains open until the piston has come back to its position of rest and re-closes this valve.

Figure 8:
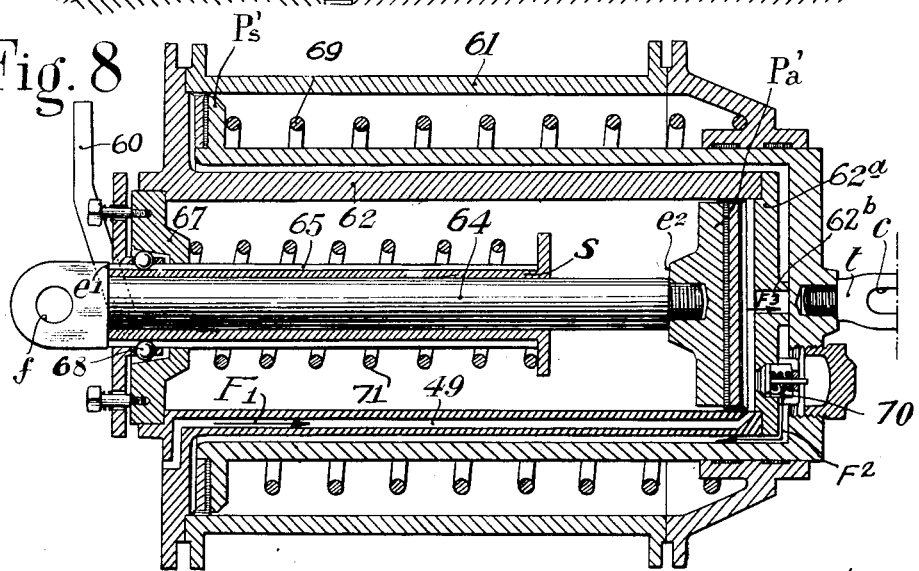

Fig. 8 illustrates a form of construction which also comprises an auxiliary piston $p_a'$ and a brake piston $p_s'$ and according to which the locking and unlocking of the piston $p_a'$ are effected without the help of any compressed air control device, and which has the advantage of being very simple and very rugged.

According to this form of construction, the bottom of the cylinder 61 of piston $p_s'$ bears a locking device 67—68 similar to that already described. Said device can be put in or out of action by means of a lever 60; the hereinabove described air control is dispensed with, and this lever is adapted to be controlled by hand only for putting the locking device out of action when it is desired to restore the apparatus to its initial position.

The balls 68, instead of directly resting on the rod of piston $p_a'$, rest on a sleeve S in which this rod freely slides, and which passes with slight friction through the bottom of the bowl 67.

As the rod of piston $p_a'$ in the forms of construction previously described, the sleeve S is provided with longitudinal grooves 65 in which the balls 68 rest.

The relative movement of the sleeve S and of the rod of piston $p_a'$ is limited by two shoulders $e_1$, $e_2$ of this rod, and the length of the sleeve S is smaller according to an extent J, than the distance separating these two shoulders.

The sleeve S is constantly urged towards the right hand side of the figure by the spring 71, compressed between the bowl 67 and a shoulder provided on the end of the sleeve.

The operation is as follows:

In brake-releasing position, and assuming the brake has not yet been used, the various parts of the braking system occupy the position illustrated; in particular, the piston $p_a'$ presses against the bottom of the cylinder in which it can slide.

Upon first application of the brakes, this piston moves towards the left and its rod slides in the sleeve S, which remains stationary until the shoulder $e_2$ presses against the same. At this moment, the piston $p_a'$ has moved according to a distance J, and, if play is to be taken up, it is subjected to the supplementary displacement U by driving the sleeve with it, until the brake shoes are applied against the rims of the wheels.

Air is then automatically admitted in the cylinder of piston $p_s'$ as will be hereinafter described, and moves the latter, which drives with it the piston $p_a'$ through the medium of brake rigging members the arrangement of which is similar to that of members $b_2$—a—$b_1$ of Figs. 1 and 2; the rod of piston $p_a'$ slides in the sleeve S.

When both pistons have thus been moved according to a distance J, the shoulder $e_1$ has come back in contact with the sleeve S, and the piston $p_a'$ is held stationary by this sleeve which is locked by the locking device, whilst the application of the brakes is produced by $p_s'$.

At the time the brakes are released, the exhaust orifices of the cylinders are opened, and the piston $p_s'$ alone comes back to its initial position, whilst the piston $p_a'$ is held stationary by the sleeve F and the locking device.

The taking up of the play has therefore been obtained by a displacement, having a value U, of the sleeve S and piston $p_a'$.

This device allows the replacement of one or more brake shoes without necessitating any adjusting operation; it suffices to act on the lever 60 for causing the spring 71 to restore the sleeve to its initial position, and after the first braking operation, it is automatically restored to such a position that the main piston $p_s'$ has only to effect a constant stroke $J+E$.

In the present form of construction, the distribution of compressed air is ensured in the following manner:

The cylinder 62 of the piston $p_a'$ is provided with a fluid-tight bottom 62a which carries a valve 70 ensuring communication with the cylinder 61.

It is moreover provided with an orifice 62b, which is closed by the piston $p_s'$ when the latter is in position of rest, and uncovered as soon as this piston begins to move; this orifice is adapted to facilitate the admission in cylinder 61 upon application of the brakes, and to allow exhaust from this cylinder upon release of the brakes.

Finally, the triple valve is in communication with a port 49 provided in the wall of the cylinder 62, and opening at the bottom of this cylinder, behind the piston $p_a'$, so that at the time the brakes are applied, the compressed air admitted through this port, as shown by arrow $F_1$, first moves the piston $p_a'$, then is admitted into the cylinder 61, first by the valve 70, as shown by arrow $F_2$, then through the orifice 62b as soon as the piston $p_s'$ has begun to move as is shown by arrow $F_3$.

Upon release of the brakes, the compressed air escapes through the orifice 62b and the port 49, in directions opposite to those shown by arrows F₃ and F₁.

In addition to those already mentioned, this device presents the following advantages:

In the first place, the cumbersomeness of the cylinder 1 is identical to that of an ordinary brake cylinder, so that these two cylinders are interchangeable, and that the apparatus according to the invention can be easily fitted on an existing braking system.

Moreover, the adjustments are simple and easy, and maintenance is reduced to lubrication, which can be effected as for an ordinary brake cylinder.

I claim:

1. In a compressed air braking device for vehicles, the combination of a stationary braking cylinder with an airtight bottom, a hollow braking piston slidable in said cylinder projecting out of this cylinder at the end opposite to said airtight bottom and provided at this end with a fulcrum, a stationary auxiliary cylinder, located with a play within said hollow piston and having an airtight bottom at the side near the outer end of the braking piston, an auxiliary piston slidably mounted in said auxiliary cylinder and adapted to take up the slack in the braking device, said auxiliary piston being also adapted for sliding in a direction opposite to that of the braking piston under the action of the compressed air, means for driving back to the rest position the braking piston and the auxiliary piston, on said auxiliary piston a rod projecting out of said auxiliary cylinder and provided at the outer end with a fulcrum, locking means on the rod of the auxiliary piston adapted for retaining said piston in its advanced position, means for the inlet of compressed air under the auxiliary piston and means for causing the compressed air to pass from the auxiliary cylinder into the braking cylinder after the auxiliary piston has been moved.

2. In a compressed air braking device for vehicles, the combination of a stationary braking cylinder with an airtight bottom, a hollow braking piston slidable in said cylinder projecting out of this cylinder at the end opposite to said airtight bottom and provided at this end with a fulcrum, a spring in said cylinder and adapted to act on the braking piston for pushing it back to the rest position, a stationary auxiliary cylinder located with a play in said hollow piston and integral with said airtight bottom of the braking cylinder, an airtight bottom on the auxiliary cylinder at the side near the outer end of the braking piston, an auxiliary piston slidably mounted in said auxiliary cylinder and provided for taking up the slack in the braking device, said auxiliary piston being adapted for moving in a direction opposite to that of the braking piston under the action of the compressed air, on said auxiliary piston a rod projecting out of said auxiliary cylinder and provided at the outer end with a fulcrum, a sleeve on said rod and in which said rod can slide with a longitudinal play, a spring in said auxiliary cylinder adapted for acting upon said sleeve for moving it to the inside of the cylinder, an abutment at each end of said rod for limiting said longitudinal play, locking means on said sleeve for retaining it and said auxiliary piston in the advanced position, means for the inlet of the compressed air under the auxiliary piston and means for causing the compressed air to pass from the auxiliary cylinder into the braking cylinder after the auxiliary piston has been moved.

3. In a compressed air braking device for vehicles, the combination of a stationary braking cylinder with an airtight bottom, a hollow braking piston slidable in said cylinder projecting out of this cylinder at the end opposite to said airtight bottom and provided at this end with a fulcrum, a stationary auxiliary cylinder, located with a play within said hollow piston and having an airtight bottom at the side near the outer end of the braking piston, an auxiliary piston slidably mounted in said auxiliary cylinder and adapted to take up the slack in the braking device, said auxiliary piston being also adapted for sliding in a direction opposite to that of the braking piston under the action of the compressed air, means for driving back to the rest position the braking piston and the auxiliary piston, on said auxiliary piston a rod projecting out of said auxiliary cylinder and provided at the outer end with a fulcrum, locking means on the rod of the auxiliary piston adapted for retaining said piston in its advanced position, means for the inlet of compressed air under the auxiliary piston and a spring valve, located in a channel provided in the bottom of the auxiliary cylinder and arranged for opening towards the inside of the hollow braking piston when the pressure in said auxiliary cylinder reaches a predetermined value.

GEORGES HOUPLAIN.